United States Patent
Willis et al.

(10) Patent No.: US 6,647,152 B2
(45) Date of Patent: Nov. 11, 2003

(54) METHOD AND SYSTEM FOR CONTOURING REDUCTION

(75) Inventors: Donald Henry Willis, Indianapolis, IN (US); John Alan Hague, Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 6 days.

(21) Appl. No.: 10/056,595

(22) Filed: Jan. 25, 2002

(65) Prior Publication Data

US 2003/0142878 A1 Jul. 31, 2003

(51) Int. Cl.[7] .............................................. G06K 9/40
(52) U.S. Cl. ............................... 382/275; 382/266
(58) Field of Search ............................ 382/260–269, 382/275

(56) References Cited

U.S. PATENT DOCUMENTS

| | | | |
|---|---|---|---|
| 4,630,104 A | 12/1986 | Nakagaki et al. | 358/36 |
| 5,101,452 A | 3/1992 | Tsai et al. | 382/50 |
| 5,138,303 A | 8/1992 | Rupel | 340/703 |
| 5,374,963 A | 12/1994 | Willis | 348/564 |
| 5,408,338 A | * 4/1995 | Koike | 358/448 |
| 5,579,054 A | * 11/1996 | Sezan et al. | 348/452 |
| 5,598,482 A | 1/1997 | Balasubramanian et al. | 382/199 |
| 5,777,624 A | 7/1998 | Munson | 345/431 |
| 5,835,117 A | * 11/1998 | Small | 347/183 |
| 5,838,298 A | 11/1998 | Shirasaka | 345/136 |
| 6,040,876 A | 3/2000 | Petitt et al. | 348/624 |
| 6,052,491 A | 4/2000 | Clatanoff et al. | 382/275 |
| 6,147,671 A | 11/2000 | Agarwal | 345/149 |

* cited by examiner

Primary Examiner—Thomas D. Lee
Assistant Examiner—Stephen Brinich
(74) Attorney, Agent, or Firm—Joseph S Tripoli; Ronald H Kurdyla; Vincent E Duffy

(57) ABSTRACT

The present invention is directed towards detecting contouring artifacts in a received video signal and reducing the detected artifacts by dithering and/or by adding least significant bits to selected pixels in the video signal. The contouring artifacts are detected by applying a magnitude difference test and/or an averaging test to a predetermined pixel span. The artifacts are reduced by substituting a replacement pixel for a selected pixel in the pixel span. A replacement pixel is generated by calculating an average pixel value for the predetermined pixel span, by reducing (e.g., rounding or truncated) the average pixel value to a bit resolution that is greater than the bit resolution of the pixels in the predetermined pixel span, or by adding a dither signal to the average pixel value.

28 Claims, 11 Drawing Sheets

METHOD AND SYSTEM FOR CONTOURING REDUCTION

FIELD OF THE INVENTION

The present invention relates to the field of image display systems, and more particularly, to methods and systems for reducing contouring artifacts in image display systems.

BACKGROUND OF THE INVENTION

All conventional digital video signals are quantized during various video-processing steps. For example, analog to digital conversion and certain compression techniques involve quantization. One drawback of quantization is that quantization tends to cause a visual artifact known as contouring in regions of the picture with very low intensity gradients. Contouring occurs when the quantization of an image signal causes contours to appear in an output image that do not exist in the input image. More specifically, when an input signal is quantized a smooth image gradient may be transformed into several large blocks of adjacent pixels, wherein each pixel in a block is assigned an identical image signal value. If these large blocks of adjacent pixels are not separated by a region of non-homogenous pixels, the blocks will cause a "stair step" effect and the smooth curve of the original image will appear to be a series of single-color flat surfaces. Contouring is associated with the ability of the human visual system to perceive small changes in image intensity in areas of an image that have low spatial variation in image intensity. If an insufficient number of bits is used to represent intensities in such areas, the human visual system perceives the change in intensity as happening in steps and not in a continuous manner.

The present invention is directed to overcoming this drawback.

SUMMARY OF THE INVENTION

Briefly stated, the present invention is directed towards detecting contouring artifacts in a received video signal and removing the detected artifacts by dithering, by adding least significant bits to selected pixels in the video signal, or by utilizing unused states.

DETAILED DESCRIPTION OF THE PREFERRED EMBODIMENT

The characteristics and advantages of the present invention will become more apparent from the following description, given by way of example.

Figure 1:
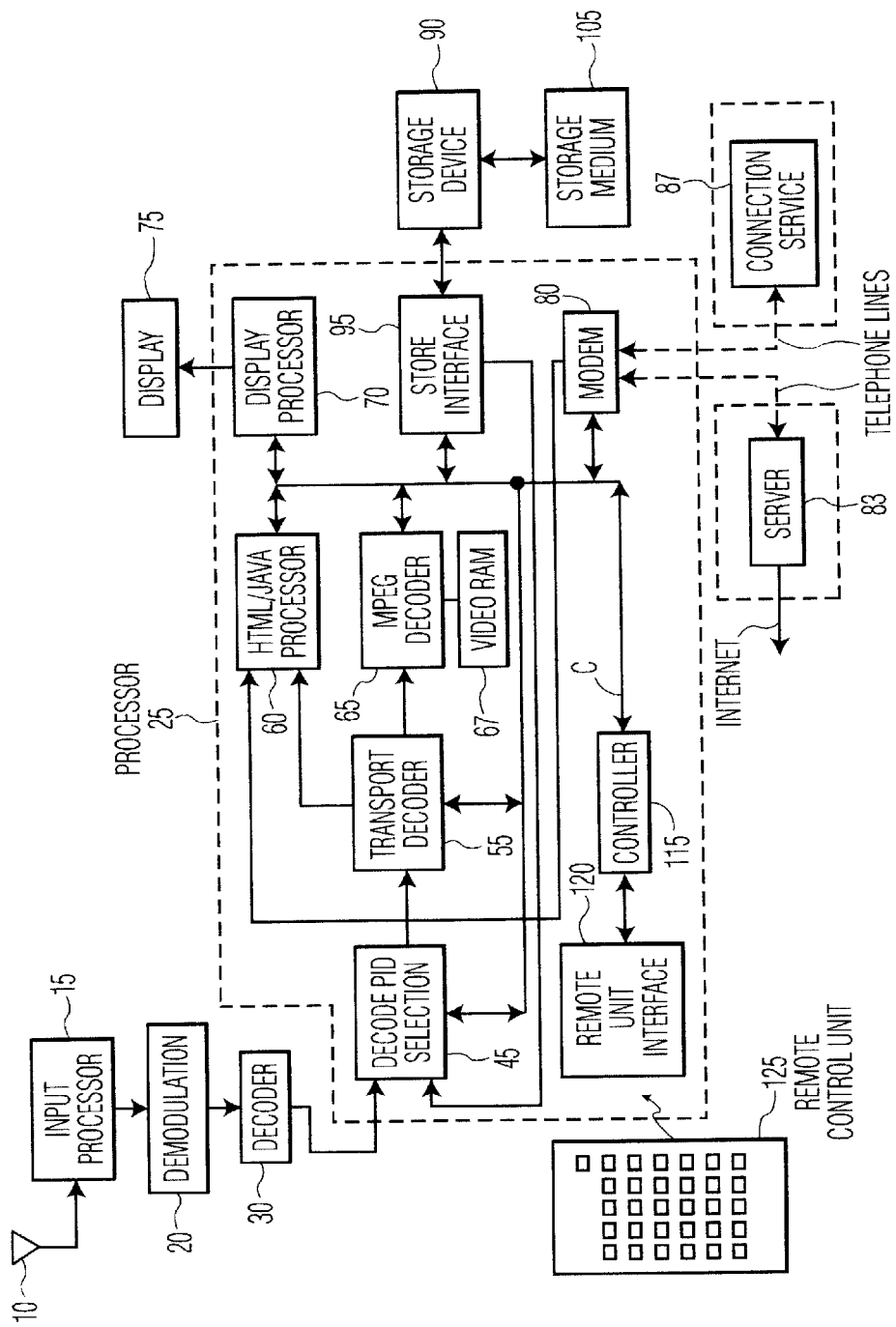
FIG. 1 is a block diagram of an exemplary home entertainment system configured to support the present invention.

Referring to FIG. 1, a block diagram of an exemplary digital video receiving system that operates according to the principles of the invention is shown. The video receiver system includes an antenna 10 and input processor 15 for receiving and digitizing a broadcast carrier modulated with signals carrying audio, video, and associated data, a demodulator 20 for receiving and demodulating the digital output signal from input processor 15, and a decoder 30 outputting a signal that is trellis decoded, mapped into byte length data segments, de-interleaved, and Reed-Solomon error corrected. The corrected output data from decoder unit 30 is in the form of an MPEG compatible transport data stream containing program representative multiplexed audio, video, and data components.

The video receiver system further includes a modem 80 that may be connected, via telephone lines, to a server 83 or connection service 87 such that data in various formats (e.g., MPEG, HTML, and/or JAVA) can be received by the video receiver system over the telephone lines.

A processor 25 processes the data output from decoder 30 and/or modem 80 such that the processed data can be displayed on a display unit 75 or stored on a storage medium 105 in accordance with requests input by a user via a remote control unit 125. More specifically, processor 25 includes a controller 115 that interprets requests received from remote control unit 125 via remote unit interface 120 and appropriately configures the elements of processor 25 to carry out user requests (e.g., channel, website, and/or on-screen display (OSD)). In one exemplary mode, controller 115 configures the elements of processor 25 to provide MPEG decoded data and an OSD for display on display unit 75. In another exemplary mode, controller 115 configures the elements of processor 25 to provide an MPEG compatible data stream for storage on storage medium 105 via storage device 90 and store interface 95. In a further exemplary mode, controller 115 configures the elements of processor 25 for other communication modes, such as for receiving bidirectional (e.g. Internet) communications via server 83 or connection service 87.

Processor 25 includes a decode PID selection unit 45 that identifies and routes selected packets in the transport stream from decoder 30 to transport decoder 55. The transport stream from decoder 30 is demultiplexed into audio, video, and data components by transport decoder 55 and is further processed by the other elements of processor 25, as described in further detail below.

The transport stream provided to processor 25 comprises data packets containing program channel data, ancillary system timing information, and program specific information such as program content rating, program aspect ratio, and program guide information. Transport decoder 55 directs the ancillary information packets to controller 115 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. Further, the program specific information contains conditional access, network information, and identification and linking data enabling the system of FIG. 1 to tune to a desired channel and assemble data packets to form complete programs.

Transport decoder 55 provides MPEG compatible video, audio, and sub-picture streams to MPEG decoder 65. The video and audio streams contain compressed video and audio data representing the selected channel program content. The sub-picture data contains information associated with the channel program content such as rating information, program description information, and the like.

MPEG decoder 65 cooperates with a random access memory (RAM) 67 to decode and decompress the MPEG compatible packetized audio and video data from unit 55 and provides decompressed program representative pixel data to display processor 70. Decoder 65 also assembles, collates and interprets the sub-picture data from unit 55 to produce formatted program guide data for output to an internal OSD module (not shown). The OSD module cooperates with RAM 67 to process the sub-picture data and other information to generate pixel mapped data representing subtitling, control, and information menu displays including selectable menu options and other items for presentation on display device 75. The control and information menus that are displayed enable a user to select a program to view and to schedule future program processing functions including tuning to receive a selected program for viewing, recording of a program onto storage medium 105, and playback of a program from medium 105.

The control and information displays, including text and graphics produced by the OSD module (not shown), are generated in the form of overlay pixel map data under direction of controller 115. The overlay pixel map data from the OSD module is combined and synchronized with the decompressed pixel representative data from MPEG decoder 65 under direction of controller 115. Combined pixel map data representing a video program on the selected channel together with associated sub-picture data is encoded by display processor 70 and output to device 75 for display.

The principles of the invention may be applied to terrestrial, cable, satellite, DSL, Internet or computer network broadcast systems in which the coding type or modulation format may be varied. Such systems may include, for example, non-MPEG compatible systems, involving other types of encoded data streams and other methods of conveying program specific information. Further, although the disclosed system is described as processing broadcast programs, this is exemplary only. The architecture of FIG. 1 is not exclusive. Other architectures may be derived in accordance with the principles of the invention to accomplish the same objectives.

In general, FIGS. 2–6 illustrate the contouring detection and reduction processes of the present invention. The processes of the present invention are preferably applied to the component values (e.g., red (R), green (G), and blue (B) component values) of a predetermined span (e.g., a single dimension horizontal and/or vertical pixel span, a multidimensional pixel span such as a two dimensional square pixel span or a circular pixel span, or any other pixel span known by those skilled in the art) of pixels, on a pixel-by-pixel basis, and may be implemented in whole or in part within the programmed instructions of display processor 70 (shown in FIG. 1). Alternatively, the processes of the present invention may be implemented in hardware in contouring detection and reduction circuitry (not shown).

Figure 2:
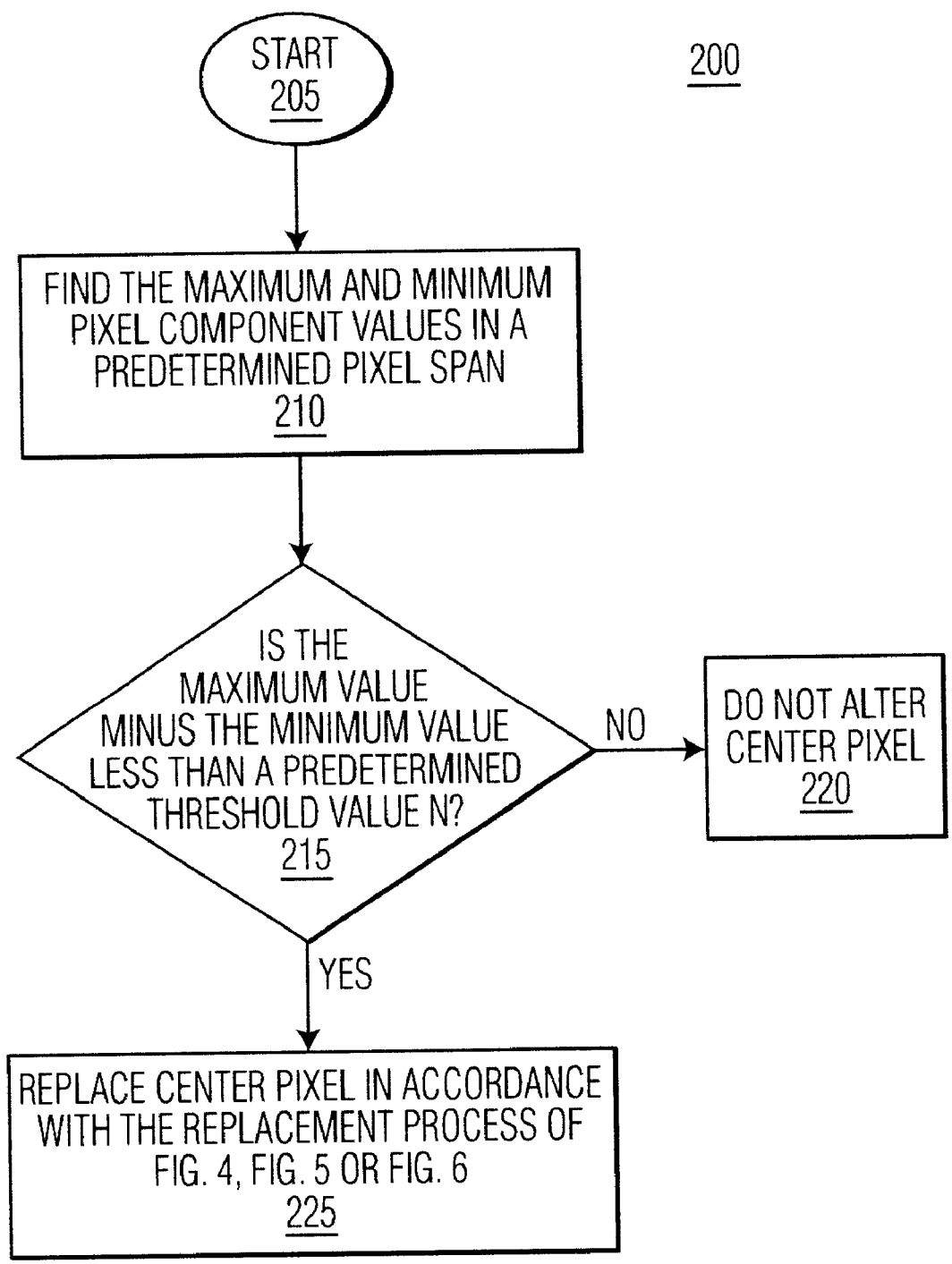
FIG. 2 is a flowchart of a preferred contouring detection test of the present invention.

Referring now to FIG. 2, a preferred contouring detection process 200 of the present invention is shown. Upon startup, at step 205, display processor 70 identifies a predetermined span of pixel component values (e.g., an 8 pixel span). After the predetermined pixel span is identified display processor 70, at step 210, determines the maximum and minimum pixel component values in the predetermined pixel span. Next, at step 215, display processor 70 determines if the maximum component value minus the minimum component value is less than a predetermined threshold value "N." The value selected for "N" is dependent on the contouring that is being guarded against and/or is anticipated as being present in a received video signal. For example, if all the states or image signal values in a received video signal are anticipated as being used and if contouring is still expected, setting "N" to be equal to 2 is appropriate. However, if every third state or image value is anticipated as being used (i.e., there are unused states or image values), setting "N" to be equal to 4 would be a more appropriate choice. If the maximum component value minus the minimum component value is not less than the predetermined threshold value "N" processor 70, at step 220, does not alter the center (or near center) pixel component value of the predetermined pixel span (e.g., the $4^{th}$ pixel component value of the 8 pixel span is not altered). If the maximum component value minus the minimum component value is less than the predetermined threshold value "N" processor 70, at step 225, replaces the center (or near center) pixel value in accordance with the contouring reduction process of FIG. 4, FIG. 5 or FIG. 6, as discussed in further detail below.

Figure 3:
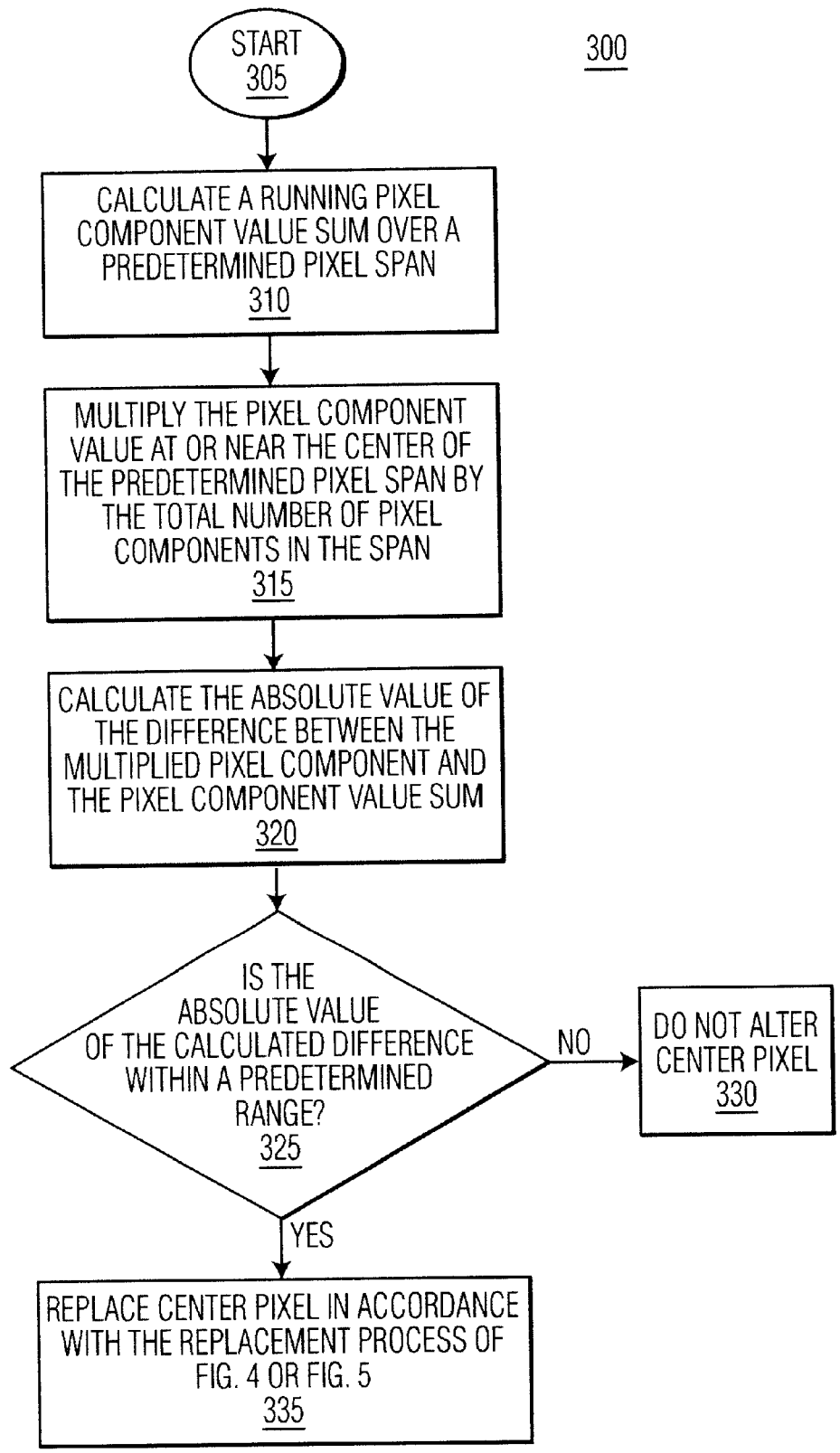
FIG. 3 is a flowchart of an alternative contouring detection test of the present invention.

Referring now to FIG. 3, an alternative contouring detection process 300 of the present invention is shown. Upon startup, at step 305, display processor 70 identifies a predetermined span of pixel component values (e.g., an 8 pixel span). Afterwards, at step 310, processor 70 calculates a running pixel component value sum over the predetermined pixel span. Next, at step 315, processor 70 multiplies the pixel component value at or near the center (e.g., the $4^{th}$ pixel component value) of the predetermined pixel span (e.g., 8 pixels) by the total number of pixel component values (e.g., 8) in the pixel span. Processor 70, at step 320, then calculates the absolute value of the difference between the multiplied pixel component value and the pixel component value sum. Next, at step 325, processor 70 determines if the absolute value of the calculated difference is within a predetermined range. One exemplary range is if the absolute value of the calculated difference is greater than 3 and less than 9. If not, processor 70, at step 330, does not alter the center pixel value. If so, processor 70, at step 335, replaces the center (or near center) pixel value in accordance with the contouring reduction process of FIG. 4, FIG. 5 or FIG. 6, as discussed in further detail below.

Figure 4:
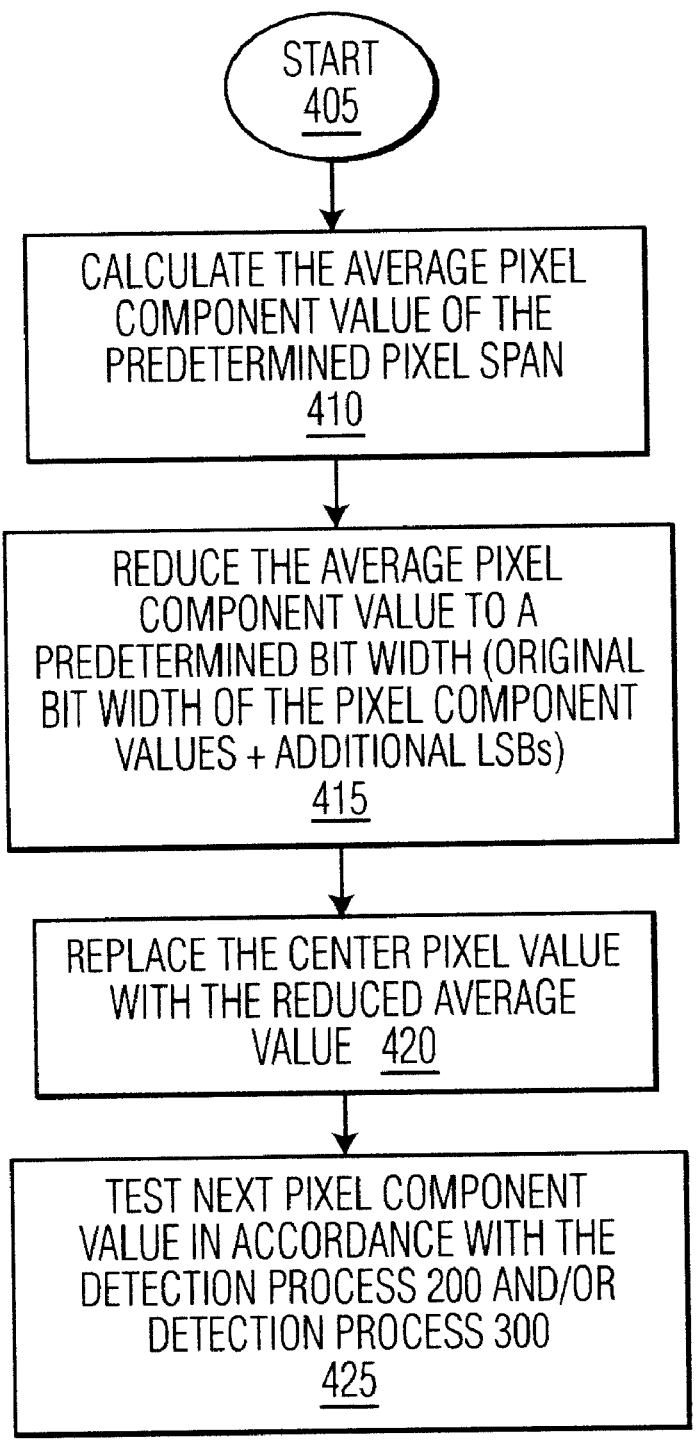
FIG. 4 is a flowchart of a contouring reduction technique of the present invention.
Figure 7:
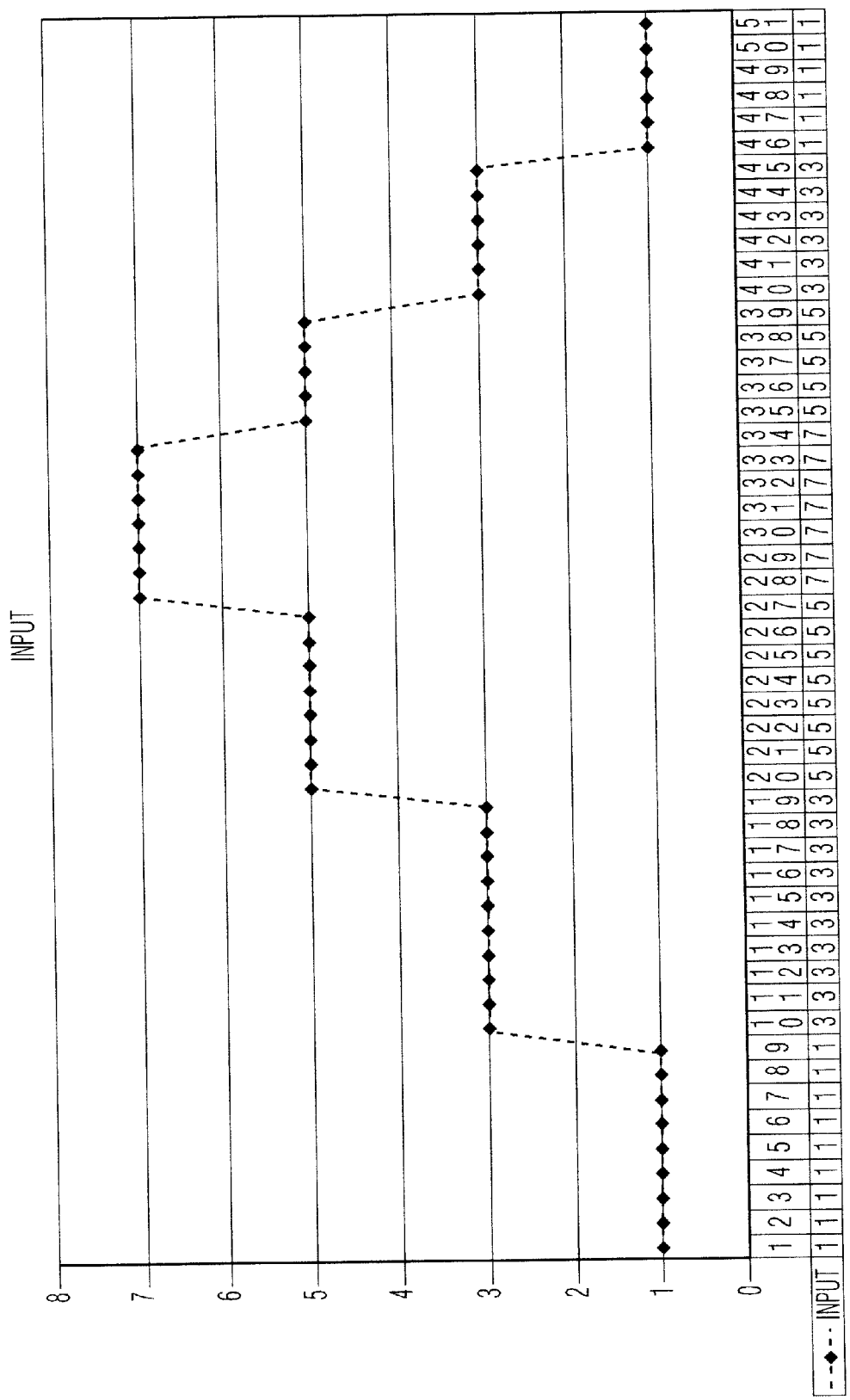
FIG. 7 is a graph illustrating an exemplary sequence of input pixel component values.
Figure 9:
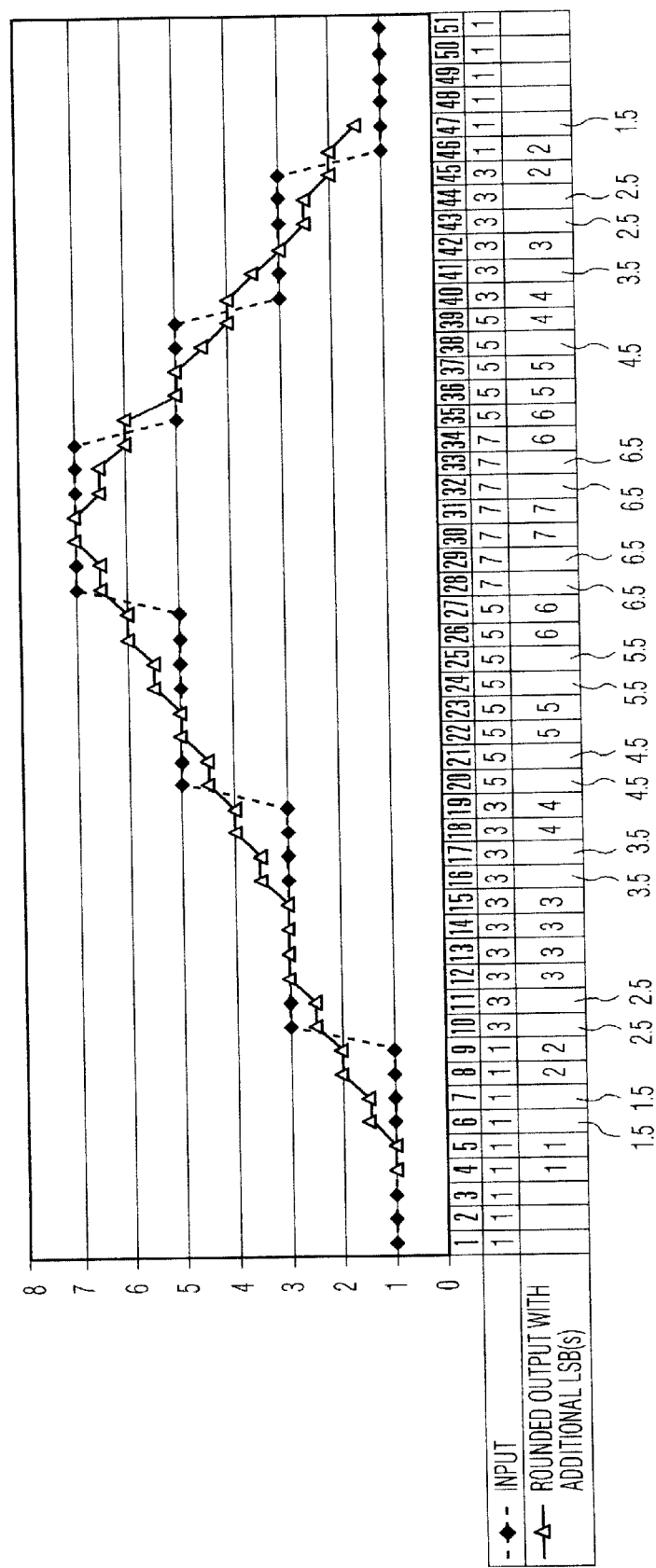
FIG. 9 is a graphical comparison of the input pixel component values of FIG. 7 and output pixel component values generated by the contouring reduction process of FIG. 4.

Referring now to FIG. 4, a contouring reduction process 400 of the present invention is shown. After it has been determined that the magnitude difference test of FIG. 2 or the averaging test of FIG. 3 has been passed, processor 70, at step 405, initiates the execution of the contouring reduction process 400. Initially, at step 410, processor 70 calculates the average pixel component value of the predetermined pixel span. Next, at step 415, processor 70 reduces (e.g., rounds or truncates) the average pixel component value to a predetermined bit width (i.e., the original bit width of the pixel component values plus an additional number of least significant bits (LSBs)). Afterwards, processor 70, at step 420, replaces the center or near-center pixel component value (e.g., the $4^{th}$ pixel value of an 8 pixel span) with the reduced average value. Processor 70, at step 425, then tests the next pixel component value in accordance with contouring detection process 200 (shown in FIG. 2) and/or contouring detection process 300 (shown in FIG. 3). A graphical comparison of an exemplary sequence of input pixel component values (shown in FIG. 7) and a sequence of output pixel component values generated by contouring reduction process 400 is shown in FIG. 9 wherein a single LSB has been added.

Figure 5:
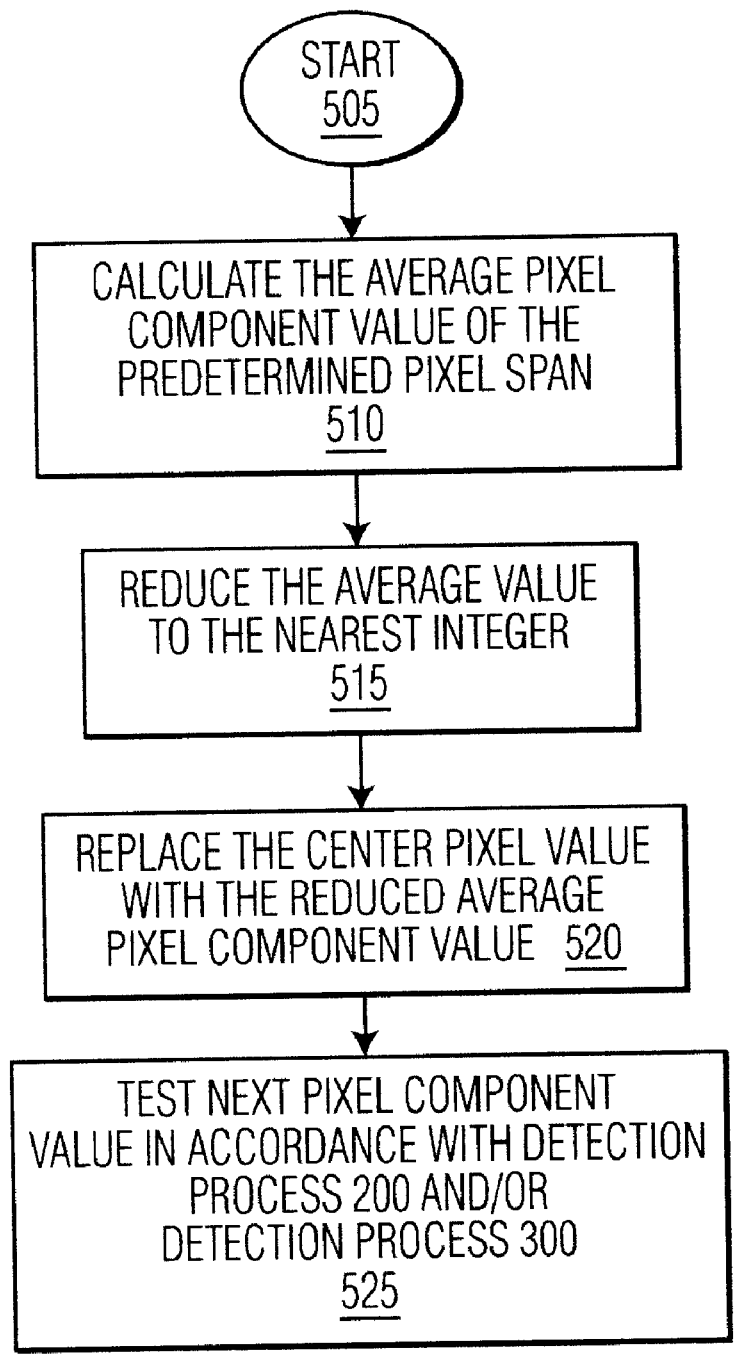
FIG. 5 is a flowchart of an alternative contouring reduction technique of the present invention.
Figure 8:
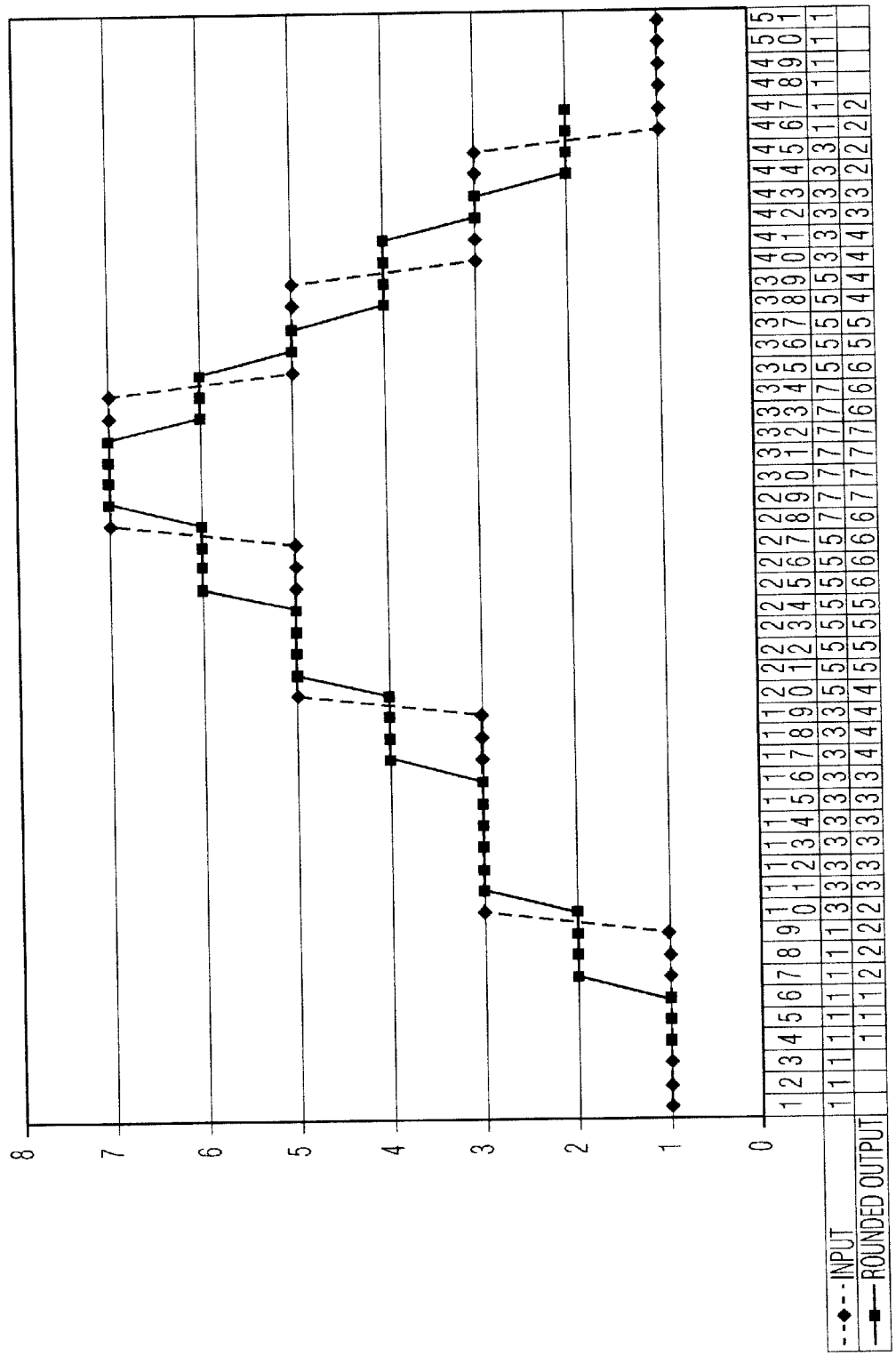
FIG. 8 is a graphical comparison of the input pixel component values of FIG. 7 and output pixel component values generated by the contouring reduction process of FIG. 5.

Referring now to FIG. 5, an alternative contouring reduction process 500 of the present invention is shown. After it has been determined that the magnitude difference test of FIG. 2 or the averaging test of FIG. 3 has been passed, processor 70, at step 505, initiates the execution of the contouring reduction process 500. Initially, at step 510, processor 70 calculates the average pixel component value of the predetermined pixel span. Afterwards, at step 515, processor 70 reduces (e.g., rounds or truncates) the average value to the nearest integer to generate a new pixel component value. Next, at step 520, processor 70 replaces the center or near-center pixel component value (e.g., the $4^{th}$ pixel value of an 8 pixel span) with the reduced average pixel component value. Processor 70, at step 525, then tests the next pixel component value in accordance with contouring detection process 200 (shown in FIG. 2) and/or contouring detection process 300 (shown in FIG. 3). A graphical comparison of an exemplary sequence of input pixel component values (shown in FIG. 7) and of a sequence of output pixel component values generated by contouring reduction process 500 is shown in FIG. 8.

Figure 6:
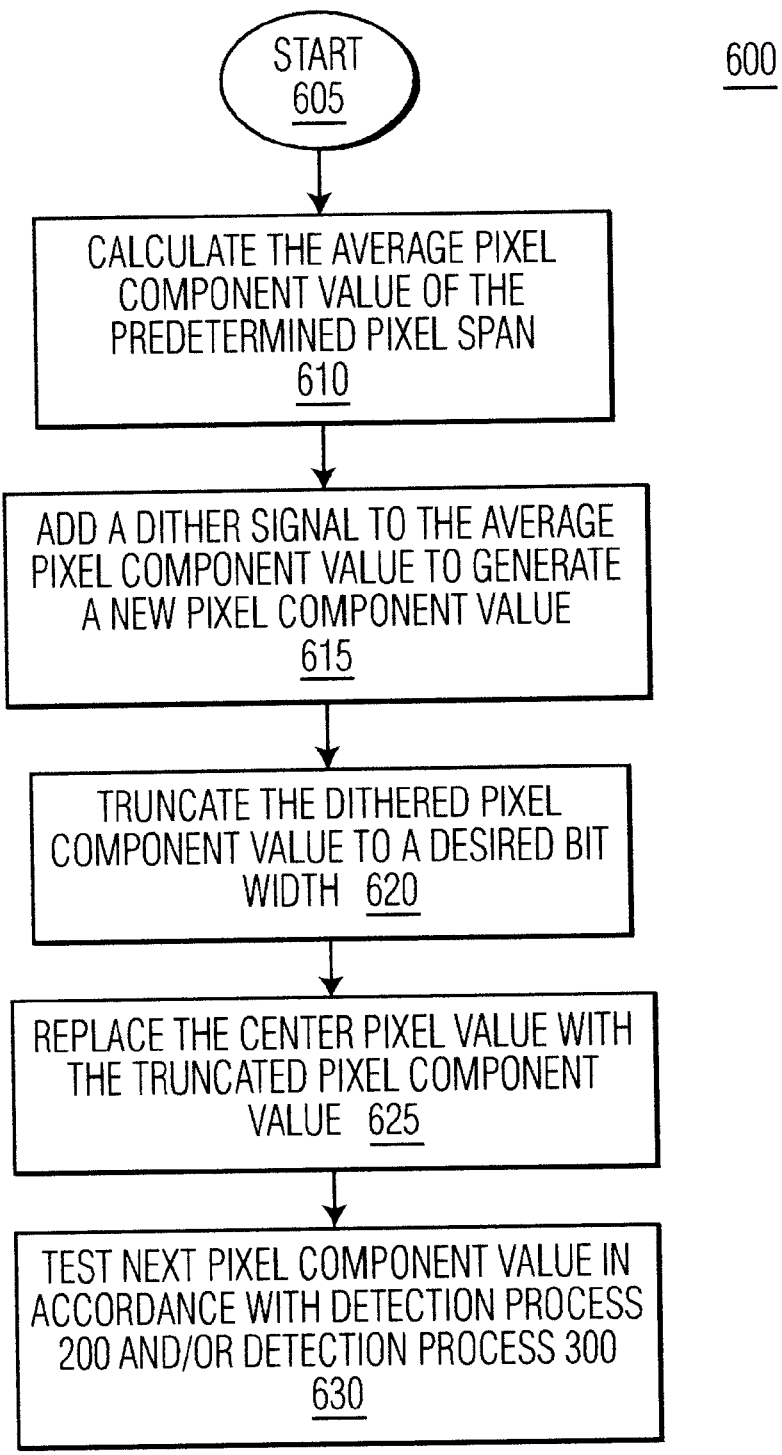
FIG. 6 is a flowchart of another alternative contouring reduction technique of the present invention.
Figure 10:
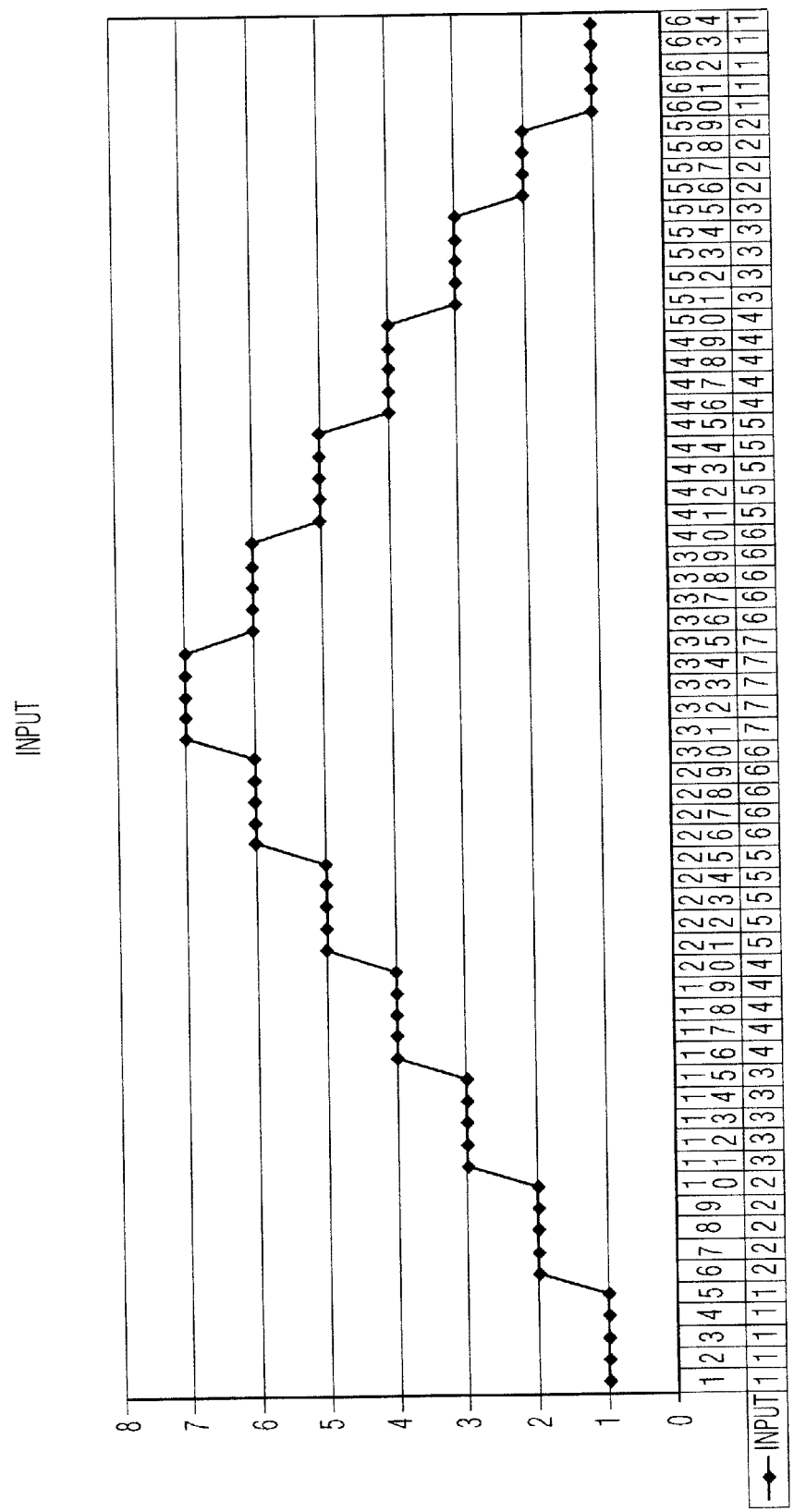
FIG. 10 is a graph illustrating another exemplary sequence of input pixel component values.
Figure 11:
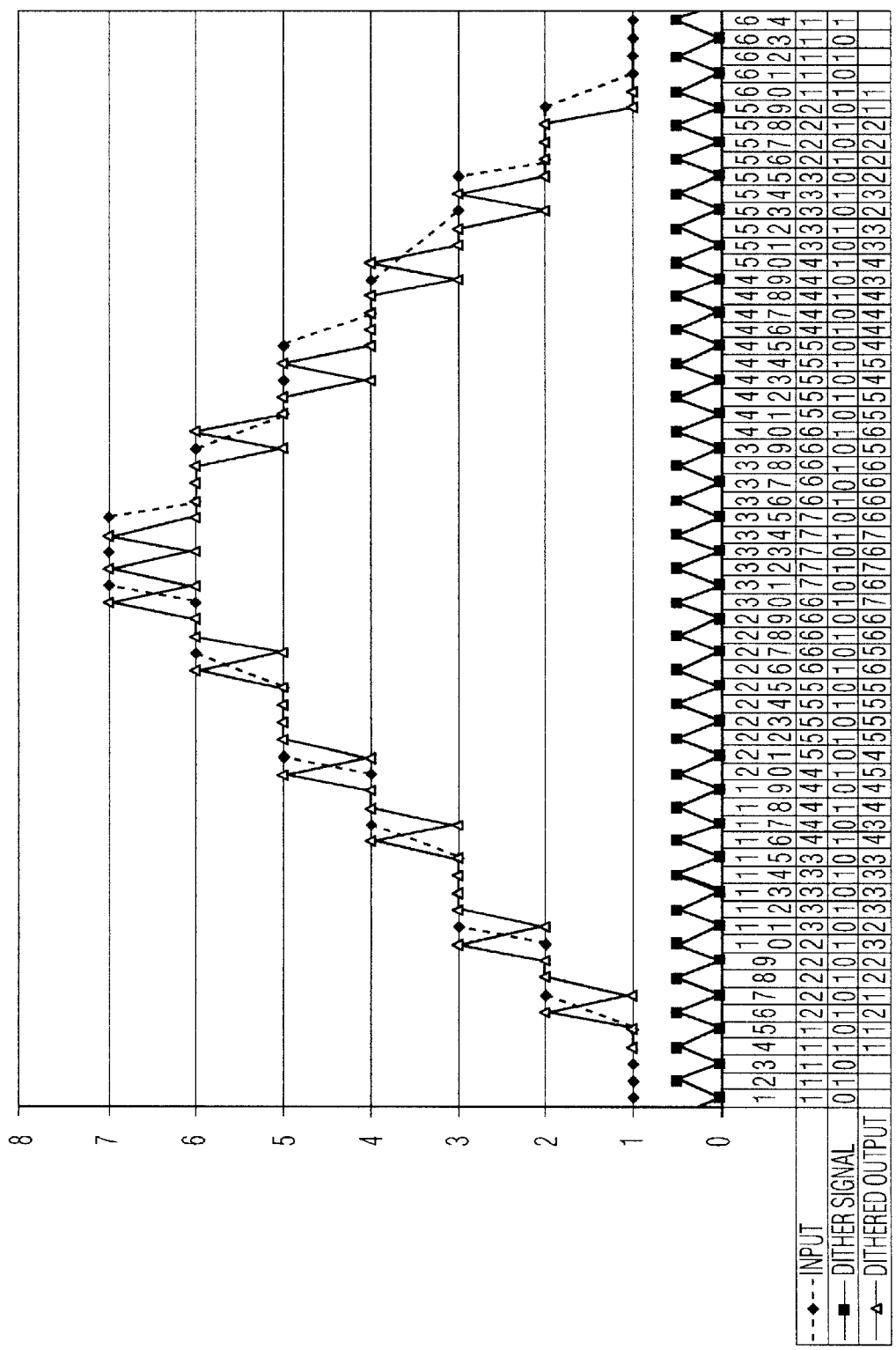
FIG. 11 is a graphical comparison of the input pixel component values of FIG. 10 and output pixel component values generated by the contouring reduction process of FIG. 6.

Referring now to FIG. 6, another alternative contouring reduction process 600 of the present invention is shown. After it has been determined that the magnitude difference test of FIG. 2 or the averaging test of FIG. 3 has been passed, processor 70, at step 605, initiates the execution of the contouring reduction process 600. Initially, at step 610, processor 70 calculates the average pixel component value of the predetermined pixel span. For example, if the bit width of each pixel component value in an 8-pixel span is 8 bits, the bit width of the average pixel component value will be 11 bits. Afterwards, at step 615, processor 70 adds a dither signal to the average to generate a new pixel component value. The dither signal may be an alternating signal such as, but not limited to, a string of alternating ones and zeroes (e.g., 1, 0, 1, 0, 1, 0 . . . ) or the dithering signal could be implemented with a recursive rounding circuit, as known by those skilled in the art. For example, a two state dither signal of alternating ones and zeroes can be added to the 11-bit average using a 9-bit adder. To do so the 11-bit average is truncated to a 9-bit average by discarding the two LSBs of the 11-bit average and then adding the two state dither signal (via the 9 bit adder) to the least significant bit of the 9-bit average. In an alternative approach, the two state dither signal can be added to the 11-bit average using an 11-bit adder. To do so the two state dither signal is added (via the 11-bit adder) to the $3^{rd}$ LSB of the 11-bit average. Next, at step 620, processor 70 truncates the dithered pixel component value to the desired bit width (e.g., the original bit width of the pixel component values). For example, the 9 bit dithered average is truncated to an 8 bit dithered average by removing the LSB or the 11 bit dithered signal is truncated to an 8 bit dithered average by removing the three LSBs. Afterwards, at step 625, processor 70 replaces the center or near-center pixel component value (e.g., the $4^{th}$ pixel value of the 8 pixel span) with the truncated pixel component value. Processor 70, at step 630, then tests the next pixel component value in accordance with contouring detection process 200 (shown in FIG. 2) and/or contouring detection process 300 (shown in FIG. 3). A graphical comparison of an exemplary sequence of input pixel component values (shown in FIG. 10) and of a sequence of output pixel component values generated by contouring reduction process 600 is shown in FIG. 11.

While the present invention has been described with reference to the preferred embodiments, it is apparent that various changes may be made in the embodiments without departing from the spirit and the scope of the invention, as defined by the appended claims.

What is claimed is:

1. A method of reducing contouring artifacts in an image display, the method comprising the steps of:

receiving a video signal, the received video signal including a plurality of pixels;

identifying a pixel span in the received video signal, the pixel span including a predetermined number of pixels;

detecting a maximum pixel value and a minimum pixel value in the identified pixel span;

calculating the difference between the maximum pixel value and the minimum pixel value;

determining that contouring artifacts are present in the identified pixel span if the calculated difference is less than a predetermined threshold value; and processing the pixels in the identified pixel span such that contouring artifacts are reduced.

2. The method of claim 1, wherein the step of processing further comprises the steps of:

calculating the average pixel value of the identified pixel span;

reducing the average pixel value to a predetermined bit width, the predetermined bit width being greater than the bit width of each pixel in the identified pixel span; and replacing a pixel at or near the center of the identified pixel span with the reduced average pixel value.

3. The method of claim 1, wherein the step of processing farther comprises the steps of:

calculating the average pixel value of the identified pixel span;

dithering the averaged pixel value to generate a replacement pixel value; and replacing a pixel at or near the center of the identified pixel span with the replacement pixel value.

4. The method of claim 1, wherein the step of processing further comprises the steps of:

calculating the average pixel value of the identified pixel span;

reducing the average pixel value to the nearest integer to generate a replacement pixel value; and replacing a pixel at or near the center of the identified pixel span with the replacement pixel value.

5. The method of claim 1, wherein the identified pixel span is a horizontal pixel span.

6. The method of claim 1, wherein the identified pixel span is a vertical pixel span.

7. The method of claim 1, wherein the identified pixel span is a multidimensional pixel span.

8. The method of claim 1, wherein a pixel span is identified for every pixel in the received video signal.

9. The method of claim 1, wherein each pixel of the plurality of pixels is comprised of three pixel components and the identifying, determining, and processing steps are carried out separately for each pixel component.

10. A system for reducing contouring artifacts in an image display comprising:
    means for receiving a video signal, the received video signal including a plurality of pixels;
    means for identifying a pixel span in the received video signal, the pixel span including a predetermined number of pixels;
    means for detecting a maximum pixel value and a minimum pixel value in the identified pixel span;
    means for calculating the difference between the maximum pixel value and the minimum pixel value;
    means for determining that contouring artifacts are present in the identified pixel span if the calculated difference is less than a predetermined threshold value; and
    means for processing the pixels in the identified pixel span such that contouring artifacts are reduced.

11. The system of claim 10, wherein the means for processing further comprises:
    means for calculating the average pixel value of the identified pixel span;
    means for reducing the average pixel value to a predetermined bit width, the predetermined bit width being greater than the bit width of each pixel in the identified pixel span; and
    means for replacing a pixel at or near the center of the identified pixel span with the reduced average pixel value.

12. The system of claim 10, wherein the means for processing further comprises:
    means for calculating the average pixel value of the identified pixel span;
    means for dithering the averaged pixel value to generate a replacement pixel value; and
    means for replacing a pixel at or near the center of the identified pixel span with the replacement pixel value.

13. The system of claim 10, wherein the means for processing further comprises:
    means for calculating the average pixel value of the identified pixel span;
    means for reducing the average pixel value to the nearest integer to generate a replacement pixel value; and
    means for replacing a pixel at or near the center of the identified pixel span with the replacement pixel value.

14. The system of claim 10, wherein the identified pixel span is a horizontal pixel span.

15. The system of claim 10, wherein the identified pixel span is a vertical pixel span.

16. The system of claim 10, wherein the identified pixel span is a multidimensional pixel span.

17. The system of claim 10, wherein a pixel span is identified for every pixel in the received video signal.

18. The system of claim 10, wherein each pixel of the plurality of pixels is comprised of three pixel components and the means for identifying, the means for determining, and the means for processing operate separately on each pixel component.

19. A method of reducing contouring artifacts in an image display, the method comprising the steps of:
    receiving a video signal, the received video signal including a plurality of pixels;
    identifying a pixel span in the received video signal, the pixel span including a predetermined number of pixels;
    calculating a running pixel value sum over the identified pixel span;
    multiplying a pixel at or near the center of the identified pixel span by the total number of pixels in the identified pixel span;
    calculating a difference between the multiplied pixel and the calculated pixel value sum;
    calculating an absolute value of the difference;
    determining that contouring artifacts are present in the identified pixel span if the absolute value of the calculated difference is within a predetermined range; and
    processing the pixels in the identified pixel span such that contouring artifacts are reduced.

20. A method of reducing contouring artifacts in an image display, the method comprising the steps of:
    receiving a video signal, the received video signal including a plurality of pixels;
    identifying a pixel span in the received video signal, the pixel span including a predetermined number of pixels;
    detecting the presence of contouring artifacts in the identified pixel span;
    calculating the average pixel value of the identified pixel span;
    reducing the average pixel value to a predetermined bit width, the predetermined bit width being greater than the bit width of each pixel in the identified pixel span; and
    replacing a pixel of the identified pixel span with the reduced average pixel value such that detected contouring artifacts are reduced.

21. A method of reducing contouring artifacts in an image display, the method comprising the steps of:
    receiving a video signal, the received video signal including a plurality of pixels;
    identifying a pixel span in the received video signal, the pixel span including a predetermined number of pixels;
    detecting the presence of contouring artifacts in the identified pixel span;
    calculating the average pixel value of the identified pixel span;
    dithering the averaged pixel value to generate a replacement pixel value; and
    replacing a pixel of the identified pixel span with the replacement pixel value such that detected contouring artifacts are reduced.

22. A method of reducing contouring artifacts in an image display, the method comprising the steps of:
    receiving a video signal, the received video signal including a plurality of pixels;
    identifying a pixel span in the received video signal, the pixel span including a predetermined number of pixels;
    detecting the presence of contouring artifacts in the identified pixel span;

calculating the average pixel value of the identified pixel span;

reducing the average pixel value to the nearest integer to generate a replacement pixel value; and replacing a pixel of the identified pixel span with the replacement pixel value such that detected contouring artifacts are reduced.

23. A method of reducing contouring artifacts in an image display, the method comprising the steps of:

receiving a video signal, the received video signal including a plurality of pixels, each pixel of the plurality of pixels being comprised of three pixel components;

identifying a pixel component span in the received video signal, the pixel component span including a predetermined number of pixel components;

detecting the presence of contouring artifacts in the identified pixel component span;

processing the pixel components in the identified pixel component span such that detected contouring artifacts are reduced; and repeating the identification, detection, and processing steps separately for each of the three pixel components.

24. A system for reducing contouring artifacts in an image display comprising:

means for receiving a video signal, the received video signal including a plurality of pixels;

means for identifying a pixel span in the received video signal, the pixel span including a predetermined number of pixels;

means for calculating a running pixel value sum over the identified pixel span;

means for multiplying a pixel at or near the center of the identified pixel span by the total number of pixels in the identified pixel span;

means for calculating a difference between the multiplied pixel and the calculated pixel value sum;

means for calculating an absolute value of the difference;

means for determining that contouring artifacts are present in the identified pixel span if the absolute value of the calculated difference is within a predetermined range; and means for processing the pixels in the identified pixel span such that contouring artifacts are reduced.

25. A system for reducing contouring artifacts in an image display comprising:

means for receiving a video signal, the received video signal including a plurality of pixels;

means for identifying a pixel span in the received video signal, the pixel span including a predetermined number of pixels;

means for detecting the presence of contouring artifacts in the identified pixel span;

means for calculating the average pixel value of the identified pixel span;

means for reducing the average pixel value to a predetermined bit width, the predetermined bit width being greater than the bit width of each pixel in the identified pixel span; and means for replacing a pixel of the identified pixel span with the reduced average pixel value such that detected contouring artifacts are reduced.

26. A system for reducing contouring artifacts in an image display comprising:

means for receiving a video signal, the received video signal including a plurality of pixels;

means for identifying a pixel span in the received video signal, the pixel span including a predetermined number of pixels;

means for detecting the presence of contouring artifacts in the identified pixel span;

means for calculating the average pixel value of the identified pixel span;

means for dithering the averaged pixel value to generate a replacement pixel value; and means for replacing a pixel of the identified pixel span with the replacement pixel value such that detected contouring artifacts are reduced.

27. A system for reducing contouring artifacts in an image display comprising:

means for receiving a video signal, the received video signal including a plurality of pixels;

means for identifying a pixel span in the received video signal, the pixel span including a predetermined number of pixels;

means for detecting the presence of contouring artifacts in the identified pixel span;

means for calculating the average pixel value of the identified pixel span;

means for reducing the average pixel value to the nearest integer to generate a replacement pixel value; and means for replacing a pixel of the identified pixel span with the replacement pixel value such that detected contouring artifacts are reduced.

28. A system for reducing contouring artifacts in an image display comprising:

means for receiving a video signal, the received video signal including a plurality of pixels, each pixel of the plurality of pixels being comprised of three pixel components;

means for separately identifying a pixel component span for each of the three pixel components of each pixel in the received video signal, the pixel component span including a predetermined number of pixel components;

means for detecting the presence of contouring artifacts in each separately identified pixel component span; and means for processing the pixel components in each separately identified pixel component span such that detected contouring artifacts are reduced.

* * * * *